No. 783,441. PATENTED FEB. 28, 1905.
G. KRESGE.
HOLDBACK ATTACHMENT FOR SINGLE HARNESS.
APPLICATION FILED JUNE 7, 1904.
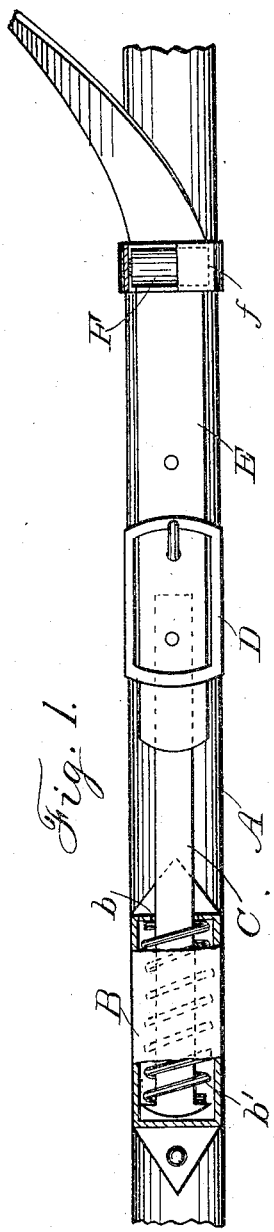
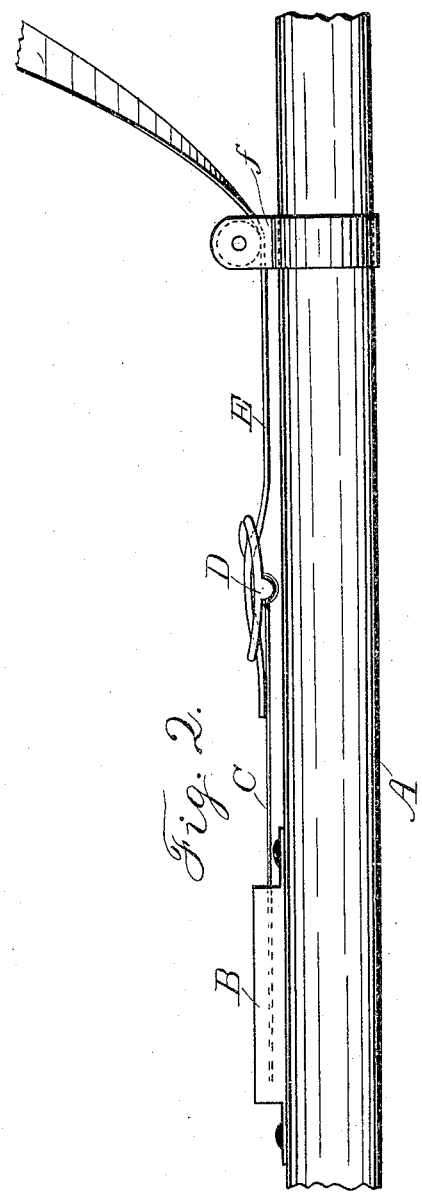

No. 783,441. Patented February 28, 1905.

UNITED STATES PATENT OFFICE.

GEORGE KRESGE, OF HANOVER, TERRITORY OF NEW MEXICO.

HOLDBACK ATTACHMENT FOR SINGLE HARNESS.

SPECIFICATION forming part of Letters Patent No. 783,441, dated February 28, 1905.

Application filed June 7, 1904. Serial No. 211,465.

*To all whom it may concern:*

Be it known that I, GEORGE KRESGE, a citizen of the United States, residing at Hanover, in the county of Grant and Territory of New Mexico, have invented new and useful Improvements in Holdback Attachments for Single Harness, of which the following is a specification.

My invention relates to harness for horses; and its objects are to improve the means by which the forward motion of the vehicle is reversed or by which its descent of a declivity is controlled.

The device is to be made and used in duplicate, and one of the pair is to be attached to each shaft of the vehicle just forward of its middle part.

The accompanying drawings illustrate the invention, in which—

Figure 1 is a plan view of the device, partly in section, as attached to a vehicle-shaft, the latter shown fragmentarily. Fig. 2 is a side elevation of the invention.

Letters of reference indicate the various features of the device, similar letters denoting corresponding parts in both views.

The letter A designates a fragment of a buggy-shaft between its middle part and its front end. B is a spring-housing secured on this shaft and having a flat opening $b$ at its rear end. C is a strip of metal passing into said opening $b$ and through a coil-spring $b'$ in the housing B and attached to the front end of said spring. The rear end of said strip carries a buckle D, to which is connected a leather strap E, used in the place of breeching. This strap E passes beneath a roller F, secured on the shaft by a clip $f$. From the roller F the strap E extends upward and rearward to be connected with the crupper of the harness or to the forward part of the crupper just rearward of the back-strap. By passing under the roller F the front end of the strap is made to reciprocate in a path parallel to the vehicle-shaft, which insures a direct and easy movement of the strip C. The straps ordinarily used for the purpose, whether connected with the crupper or back-strap of the harness or with the breeching attached rigidly to the shaft, have proven to be painful and injurious to the horse, because of their sudden and violent action in arresting the forward throw of the vehicle and the consequent jerk at the crupper. This is wholly avoided by my invention, as the strap E is attached to the strip C, which reciprocates longitudinally in the housing B and by means of the spring $b'$ converts the sudden jerk on the strap into a gentle tension endurable by the horse and moderating or entirely avoiding the unsteady motion of the vehicle when descending a declivity.

Having described my invention, what I claim and desire to secure by Letters Patent of the United States, is—

In an attachment for single harness having a housing on the vehicle-shaft, a spring therein, and a strip connected to said spring, and reciprocating in said housing, a strap connected to said strip, a clip on said shaft rearward of said housing, and a roller in said clip beneath which said strap is passed before its attachment to the harness substantially as described.

In testimony whereof I have signed my name to this specification in the presence of two subscribing witnesses.

GEORGE KRESGE.

Witnesses:
 FRANK J. WRIGHT,
 JOHN W. CARTER.